United States Patent Office 2,735,840
Patented Feb. 21, 1956

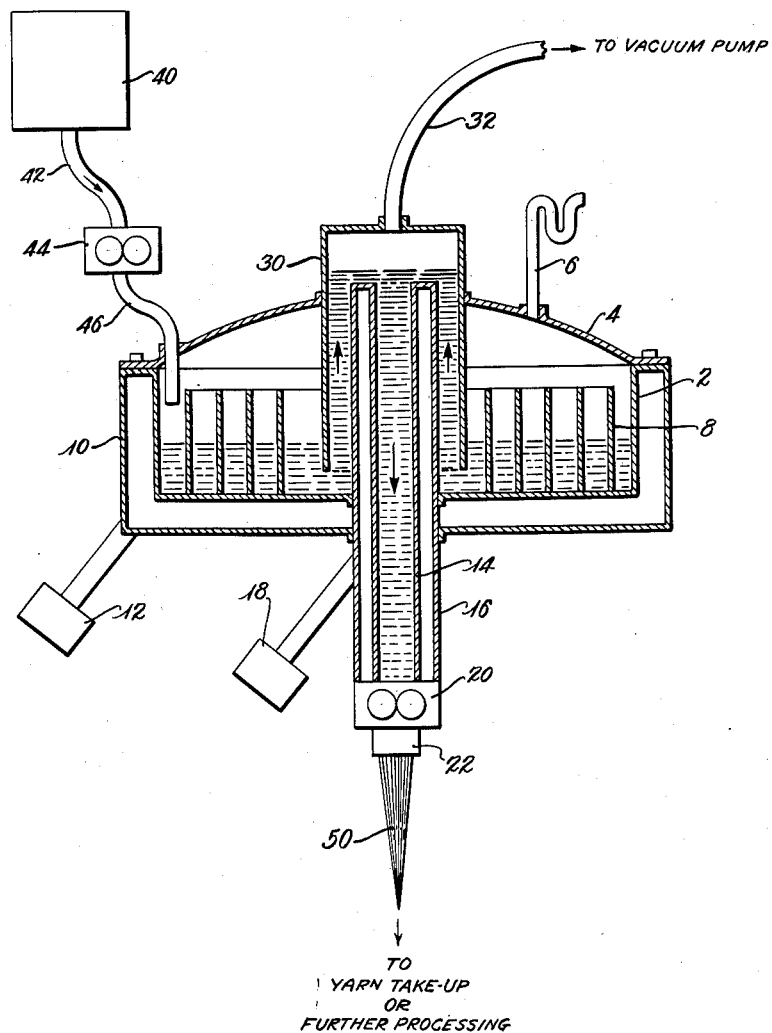

2,735,840

POLYMERIZATION OF MONOMERIC LACTAMS

Ridgeway T. Lynch, Asheville, N. C., assignor to American Enka Corporation, Enka, N. C., a corporation of Delaware Application June 16, 1953, Serial No. 362,085

4 Claims. (Cl. 260—78)

This invention relates to process and apparatus for continuously manufacturing high molecular weight polymeric substances by heating relatively low molecular weight compounds, with or without catalysts and/or stabilizers, and particularly to the continuous manufacture of high molecular weight synthetic linear polyamides, wherein a high molecular weight polymeric product having a relatively low monomer content is obtained. Still more particularly, the invention is concerned with process and apparatus for preparing high molecular weight polymeric compounds of low monomer content continuously from monomeric materials such as lactams having six or more carbon atoms per molecule, and especially where caprolactam is the particular lactam under consideration.

In the production of high molecular weight synthetic linear polyamides of the type with which the present invention is concerned, and especially those produced from a lactam such as caprolactam, an equilibrium between the polymeric and the monomeric components of the reaction mixture is ultimately established in which the monomer content is about 10 to 11% by weight. The resulting polymeric material is then generally extruded from the autoclave in which the reaction takes place in the form of "spaghetti" which is then cut up into chips. By washing these chips of polymeric material with a suitable selective solvent such as hot water the monomer content may be reduced to about 2 per cent. However, upon grid spinning the washed chips of polymer a filament is obtained having a monomer content of the order of about 4%. The presence of this much monomer in the polymeric product generally has an undesirable effect on the physical properties of the finished yarn, and hence an additional monomer-removal step is usually included in the yarn production scheme. Thus, it is common practice to wash the polycaprolactam yarn with hot water in order to remove the monomer after the yarn has been drawn. The avoidance of monomeric constituents in high polymeric substances of the kind here involved is therefore an important desideratum.

It is therefore an object of the present invention to provide process and apparatus for conducting polymerization reactions of the type mentioned above in which the disadvantages and imperfections of the prior art processes and apparatus are largely overcome. It is a further object of the invention to provide a convenient process that involves the use of simple apparatus for carrying out the continuous polymerization of low molecular weight monomeric materials to high molecular weight polymerization products, especially those of the polyamide type, in such manner as largely to avoid the known disadvantages frequently encountered when the usual polymerization methods and apparatus are employed, and more particularly to avoid the production of high molecular weight polymerization products of the aforesaid type containing undue quantities of residual monomeric materials in association therewith.

The manner in which these and other objects of the invention are attained will become apparent from the following description of the invention, which is intended to be illustrative rather than limitative.

According to the present invention, it has been discovered that a polymer product of high quality may be obtained in a very simple and effective manner by subjecting an at least partly polymerized mass, preferably obtained by a continuous polymerization procedure carried out in an elongated polymerization zone, to a relatively high vacuum prior to extrusion thereof from the polymerization apparatus, in order to remove all or substantially all of any monomer or other relatively volatile components remaining therein. While the process may be carried out in many diverse ways, it has been discovered that particularly desirable results may be obtained by carrying out the polymerization continuously in a first polymerization zone in which the monomer is at least largely, if not substantially completely polymerized, i. e., relative to the equilibrium conditions mentioned above, after which the substantially polymerized mass is passed immediately into a communicating zone or region, which may or may not be physically adjacent the first polymerization zone, in which the largely polymerized material is subjected to a fairly high degree of vacuum preliminarily to discharging the polymerized mass from the polymerization reaction vessel to further treatment, including spinning and/or other after-treatment, and in which zone or region residual monomer (with perhaps some low polymers) is removed by volatilization under the influence of heat combined with relatively high vacuum. The polymerized material preferably is then passed immediately through another zone, which may advantageously be a continuation of the vacuum zone, in which it continues to be subjected to elevated temperatures conducive to the polymerization reaction, thus leading to the production of the desired high polymeric material substantially free of relatively low boiling constituents.

According to one particularly desirable embodiment of the invention, it has been discovered that the polymerization may advantageously be initiated and completed to at least a fairly advanced degree while the reaction material is flowing through a spiral or helical polymerization vessel of the same general character as that described and illustrated in the co-pending Schrenk U. S. application Serial No. 258,810; after which the polymerized or partially polymerized mass is immediately introduced into a communicating vacuum-applying zone in which the reaction material is subjected to a suitable high vacuum under the influence of which (in combination with the sensible heat contained in the reaction mass) all or substantially all of any residual monomeric material, or other relatively low boiling components such as low polymers of only a few repeating units length, is removed therefrom, thus leaving as product only the relatively high molecular weight synthetic linear polyamide material that is of very high quality by reason of its relatively low monomer or other low boiler content. The high quality polymeric material thus produced may then be removed from the apparatus, with or without further processing. The further processing may take any desired form such as other after-treatment procedures or, if desired, passing the polymeric material through a grid melt-spinning apparatus associated directly with the polymerizing apparatus from which the desired filaments are extruded in per se known manner.

In order still further to illustrate the present invention, reference is made to the accompanying diagrammatic drawing showing in somewhat schematic form, and in partial vertical cross-section, a suitable polymerization vessel embodying the principles of the invention, in combination with a melt-spinning device for the resulting high polymer.

As there shown, the apparatus comprises a chamber or tank 2 provided with a gastight cover 4, which in turn is suitably vented via line 6. Within the tank 2 is an involute spiral mushroom section 8, which may conveniently be formed by a single continuous spiral or helical baffle strip fastened to the bottom of tank 2, as described in the above-mentioned Schrenk application, thereby forming an elongated tortuous path for the flow of monomeric material while being subjected to polymerization conditions.

Surrounding the tank 2 is a heating jacket 10 through which circulates a heat exchange fluid such as "Dowtherm" from a suiatble source 12 in conventional manner. Located centrally of the tank 2, and hence of the spiral mushroom section 8, is a vertical polymerization column 14 which is provided with a jacket 16 for heat exchange fluid circulating therethrough from heat exchange fluid source 18 in conventional fashion. As in the case of 12, the heat exchange fluid may be "Dowtherm" or the like. The lower part of the column 14 communicates with a polymer pump block 20 including one or more spinneret assemblies 22 in the usual fashion well known per se in grid melt-spinning processes employing polymeric materials of this general character.

It will be observed that the column 14 and its heating jacket 16 extend well above the top level of the spiral mushroom section 8 defined by the tank 2 of the polymerization vessel, and surrounding the upper portion of the column 14 there is disposed an inverted cup-shaped member 30 which is attached to and supported by the cover 4. The walls of this inverted member 30 extend downwardly almost to the bottom of the spiral mushroom seciton 8 of the polymerization vessel, i. e., almost to the bototm of tank 2. Communicating with the upper portion of the inverted cup-shaped member 30 is a line 32 leading to a suitable system of condensers and vacuum pumps (not shown), whereby relatively volatile constituents are removed from the relatively high molecular weight material passing through the member 30 and column 14.

The monomeric charge stock, such as caprolactam or other lactam or other material which upon polymerization forms the desired high molecular weight synthetic linear polyamide, is introduced, e. g. in molten condition, from the supply tank 40 via line 42, pump 44 and line 46 to the outermost portion of the involute spiral mushroom section 8 within the tank 2. The molten monomeric material flows spiraliy towards the center of the mushroom section 8 during which time it is brought to a predetermined temperature by means of the hot Dowtherm or other heat exchange fluid circulating through jacket 10 from Dowtherm supply 12. In the case of molten caprolactam the temperature within the involute spiral mushroom section is maintained at approximately 265° C., thereby promoting the desired polymerization to polycaprolactam. The monomeric material is at least largely polymerized by the time it reaches the center of the mushroom section 8, or in other words its composition approaches that of an equilibrium mixture which, in the case of caprolactam, corresponds substantially to a monomer content of about 10–11%. This equilibrium mixture is then drawn upwardly into the inverted cup-shaped member 30 because of the reduced pressure to which the interior of that member is subjected via vacuum line 32. The pressure within the interior of the inverted cup-shaped member 30 is maintained at a suitable low level, for example 0.1 mm. Hg absolute, by means of the vacuum pump or pumps, as a result of which the largely polymerized material is pulled up over the outside walls of the jacketed column 14 and into the inside of the column 14; and in the meantime the relatively low boiling material remaining in the reaction mixture (consisting of residual not-yet-polymerized monomer with perhaps some relatively low polymers such as dimers, trimers, etc.) is volatilized under the influence of the heat and greatly reduced pressure and thereby removed from the system via the line 32.

The molten largely polymerized material in the space between the inside wall of the cup-shaped member 30 and the outer wall of the jacketed column 14 serves as a fluid seal of molten polymeric material and thereby permits a substantial pressure differential between the involute spiral mushroom section 8 and the cup-shaped member 30. Thus the interior of the mushroom section 8 is maintained at substantially atmospheric pressure.

After the column 14 has become completely filled with the relatively high molecular weight synthetic linear polymeric material (which is now substantially completely free of residual relatively low boiling components because of the treatment described above to which it has been subjected during processing) the polymer pump 20 is started and the low-monomer polymeric product is extruded through the spinneret 22 to form the bundle of filaments 50 which are taken up in conventional manner for further processing and/or use. Thereupon the process is made continuous by feeding the monomeric charge stock continuously and spinning the filaments in like manner.

In the foregoing manner the polymerization of the monomeric starting material to a high molecular weight synthetic linear polyamide product having a relatively low monomer content, e. g., of the order of about 2% or less, is effected continuously in one simple and convenient operation, thereby producing a high polymeric product of greatly enhanced quality at relatively low cost.

The polymerization of the epsilon-caprolactam or other lactam, or other material which upon polymerization forms the desired high molecular weight synthetic linear polymer, may be effected in any desired manner known per se to the art, and need not be further described since in and of itself it forms no part of the present invention. Suffice it to say merely by way of example that the polymerization (in the case of a lactam) may be effected in the presence of a small quantity of a mineral acid and a small quantity of water as catalyst and that the temperature of polymerization may be varied over fairly wide limits. An inert atmosphere, such as of nitrogen, may be interposed over the reaction mass in the spiral mushroom section 8, if desired.

The polymerization may be initiated in a reaction vessel other than one of involute spiral form (e. g., while the initial charge stock pursues a zig-zag path while undergoing polymerization) without departing from the spirit of the invention, so long as the substantially completely polymerized material is passed into an adjacent zone where it is subjected to a high vacuum prior to ejection from the polymerization apparatus, and it will therefore be understood that the involute spiral form of the initial polymerization chamber that is associated with the vertical polymerization column represents merely a preferred form of that portion of the apparatus.

The condenser-vacuum pump system to which the vacuum line 32 leads may be e. g. a jet condenser or a combination of surface condensers and separate vacuum pumps, especially where it is desirable for economic reasons to recover for reuse the monomer removed from the reaction mixture via line 32.

When the apparatus is employed for the polymerization of substances which either in the monomeric or the polymeric form may be corrosive, or where any other component of the reaction mixture may be corrosive, it is preferable to manufacture at least those parts that come in contact with such substances from a suitably resistant material such as stainless steel or the like.

While specific examples of preferred methods and apparatus embodying the present invention have been described above, it will be apparent that many changes and modifications may be made therein without departing from the spirit of the invention. It will therefore be understood that the particular apparatus and methods of procedure set forth above are intended to be illustrative only, and are not intended to limit the invention.

What is claimed is:

1. A process for the continuous production of high molecular weight fiber-forming synthetic linear polyamides by heating relatively low molecular weight monomeric lactams which comprises heating such a monomeric lactam to be polymerized in the molten state while flowing through an elongated spiral substantially horizontal polymerization zone of great length as compared to its height while in the form of a continuously flowing uninterrupted layer of liquid having an unconfined upper surface, and under conditions such as to effect polymerization of said monomeric lactam, passing the polymerized material from the polymerization zone into a discharge zone through a communicating fluid sealing zone in which is maintained at all times a substantial quantity of the polymerized material in process to constitute the seal, applying a relatively high vacuum to the upper surface of the polymeric material in said fluid sealing zone in order substantially completely to remove residual low molecular weight substances including water from the polymeric material, maintaining the discharge zone substantially filled with a relatively large mass of the polymeric material, and removing thus-purified polyamide product from said discharge zone.

2. A process as defined in claim 1 in which the monomeric lactam undergoing polymerization is caprolactam.

3. A process for the continuous production of high molecular weight synthetic linear polyamide filaments derived from high molecular weight fiber-forming polymeric lactams which comprises heating a relatively low molecular weight monomeric lactam to be polymerized in the molten state while flowing through an elongated spiral substantially horizontal polymerization zone of great length as compared to its height while in the form of a continuously flowing uninterrupted layer of liquid having an unconfined upper surface, and under conditions such as to effect polymerization of said monomeric lactam, passing the polymerized material from the polymerization zone into a discharge zone through a communicating fluid sealing zone in which is maintained at all times a substantial quantity of the polymerized material in process to constitute the seal, applying a relatively high vaccum to the upper surface of the polymeric material in said fluid sealing zone in order substantially completely to remove residual low molecular weight substances including water from the polymeric material, maintaining the discharge zone substantially filled with a relatively large mass of the polymeric material, removing thus-purified polyamide from said discharge zone, and thereafter passing the resulting purified polyamide through a spinneret under pressure in order to form said polyamide filaments.

4. A process as defined in claim 3 in which the monomeric lactam undergoing polymerization is caprolactam.

References Cited in the file of this patent

UNITED STATES PATENTS

| 902,177 | Schwoerer | Oct. 27, 1908 |
| 1,036,609 | Grosvenor | Aug. 27, 1912 |
| 2,090,586 | Ward | Aug. 17, 1937 |

FOREIGN PATENTS

| 237,400 | Switzerland | Sept. 1, 1945 |

OTHER REFERENCES

Ser. No. 309,376, Friederich et al. (A. P. C.), published Apr. 20, 1943.